Jan. 25, 1955  H. SCHMID ET AL  2,700,225
COFFEE ROASTER
Filed Dec. 16, 1949  7 Sheets-Sheet 1
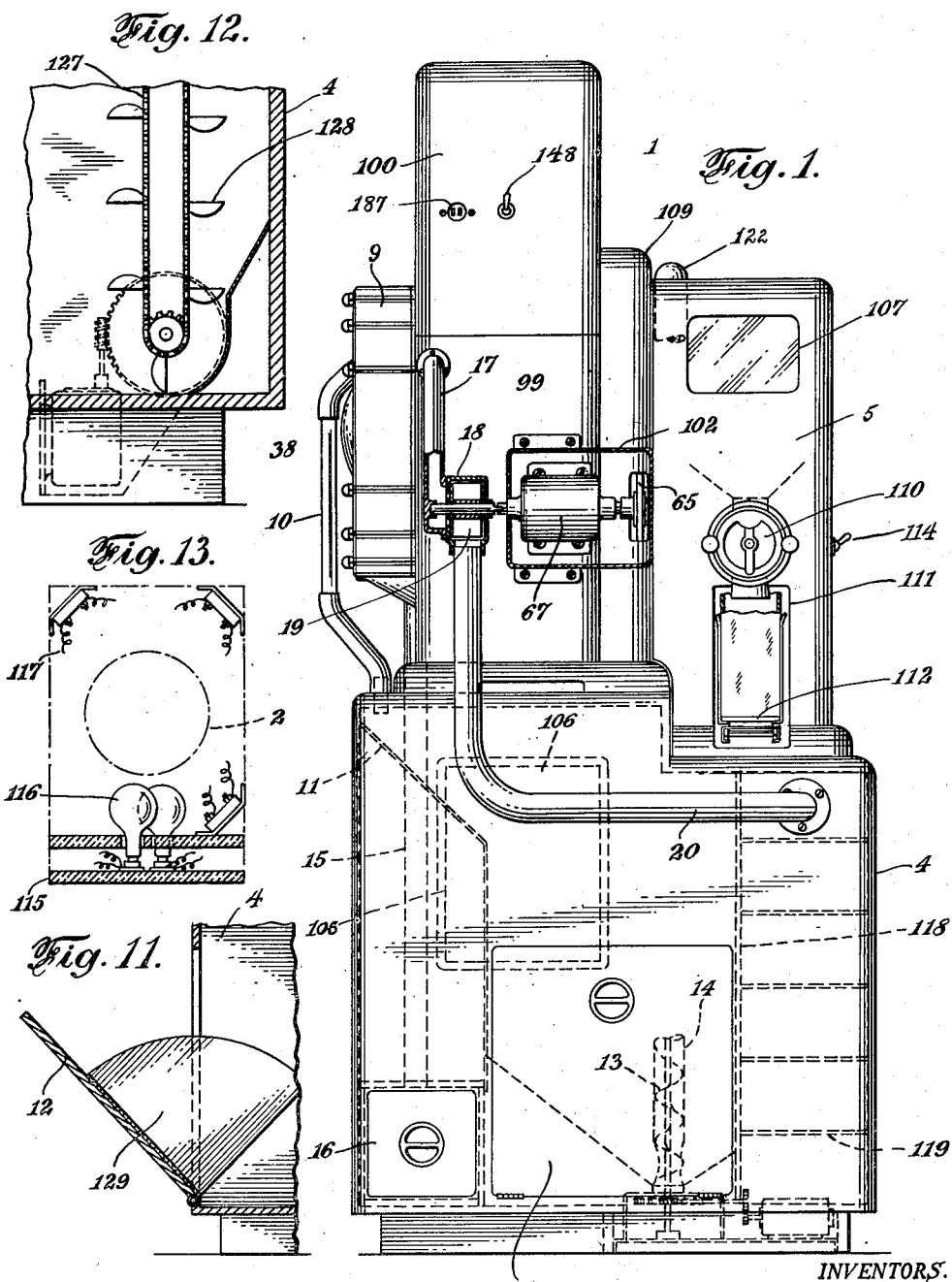
INVENTORS.
Herman Schmid
Albert P. Hobush.
BY
William F. Nickel
ATTORNEY.

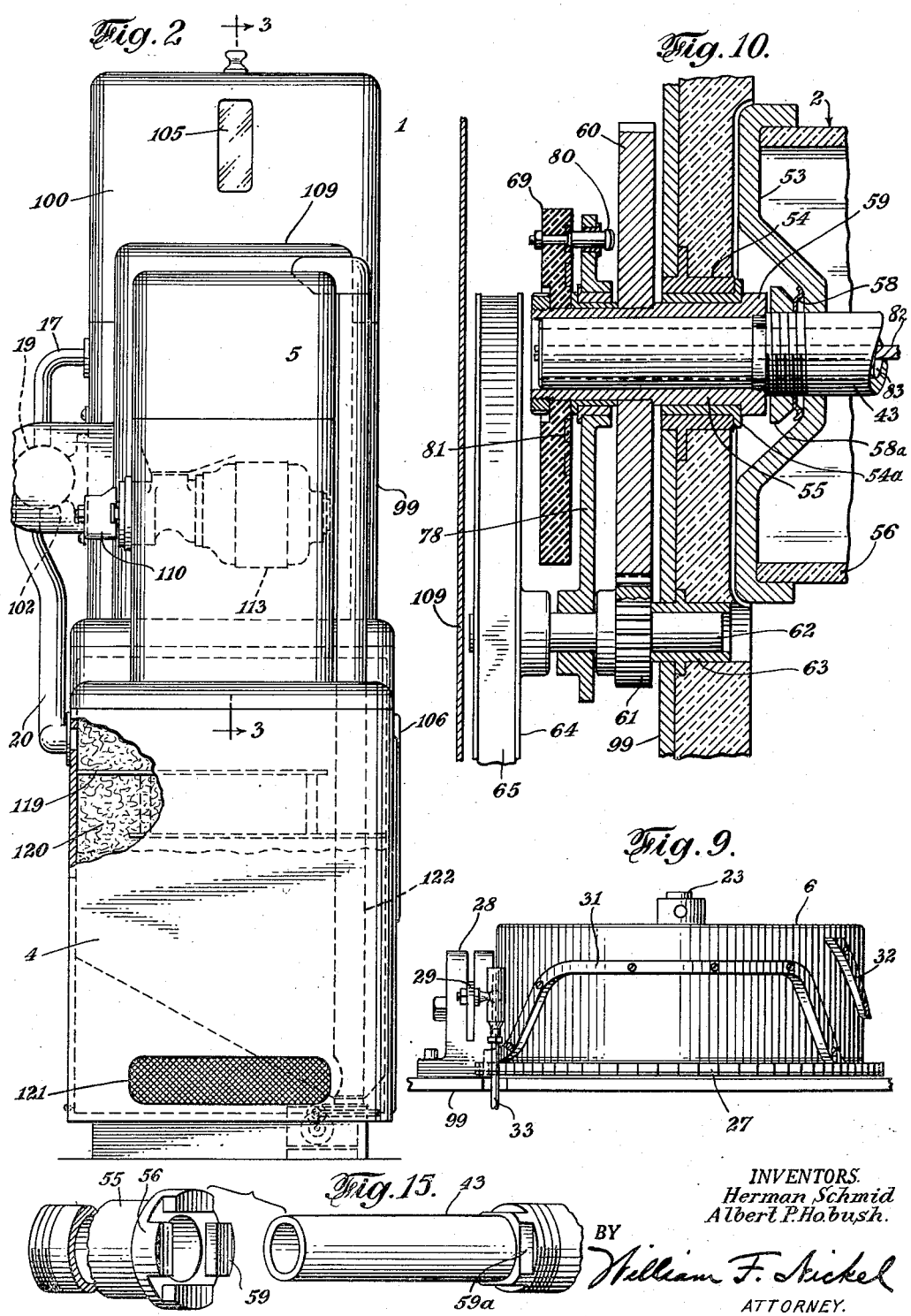

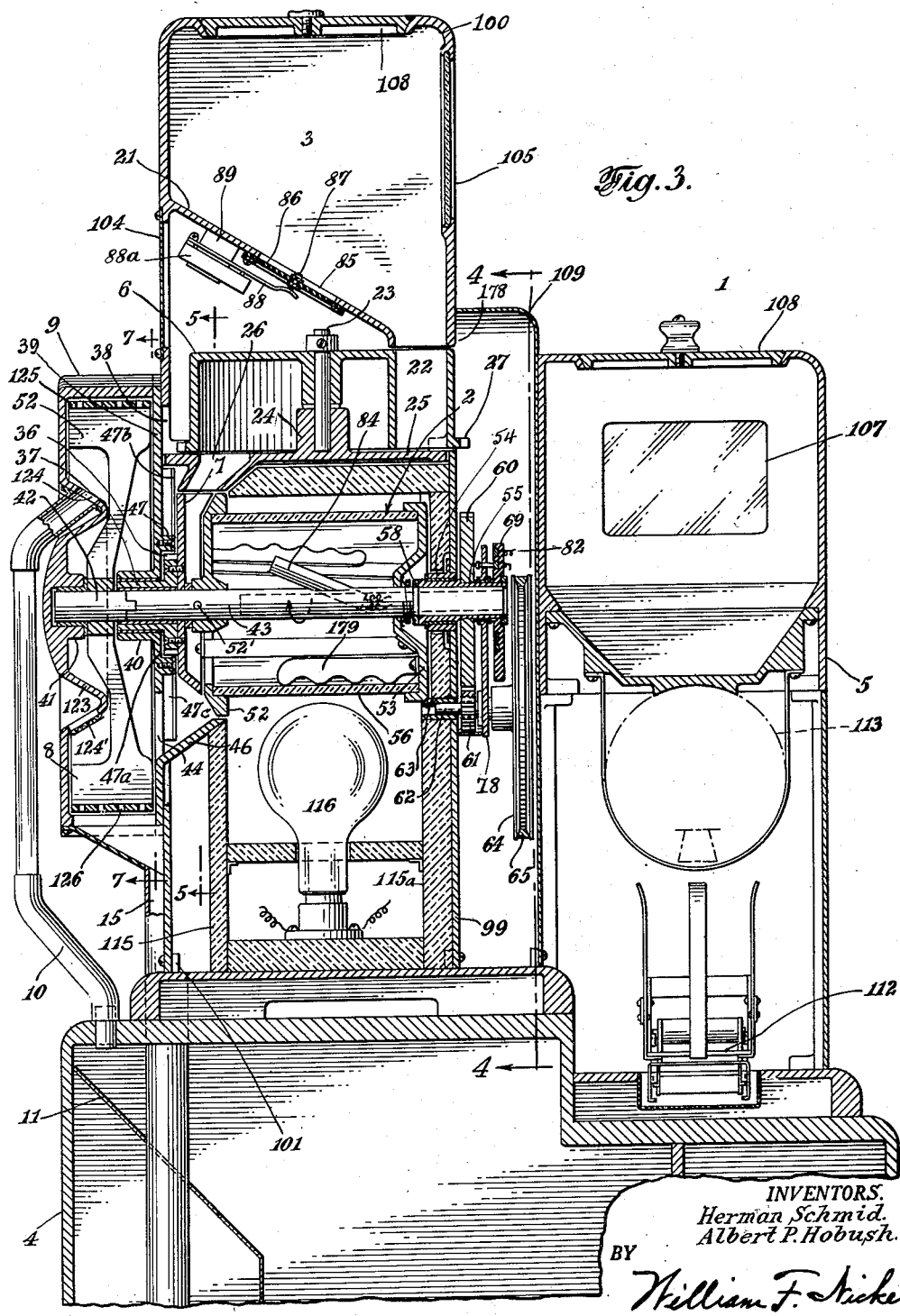

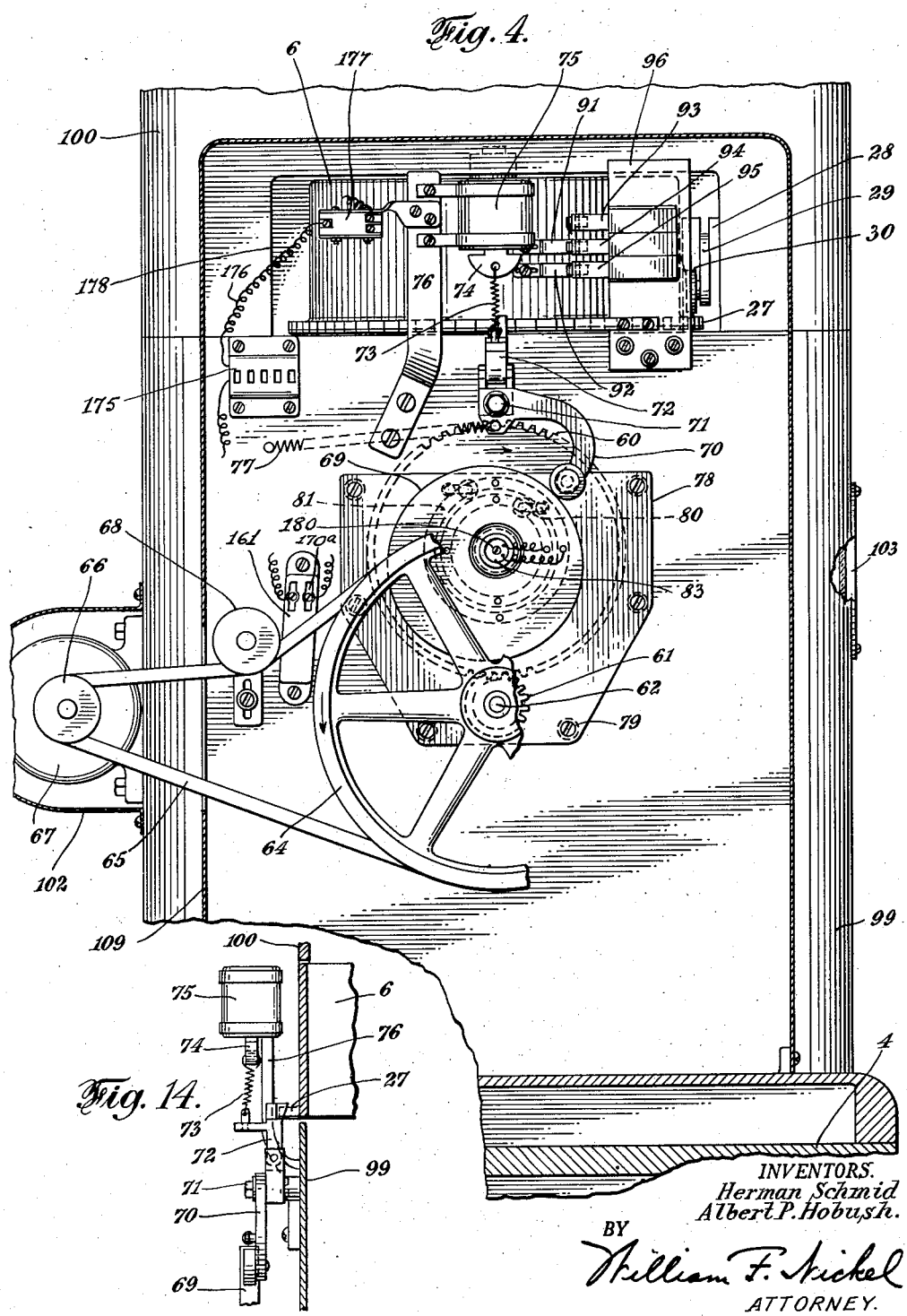

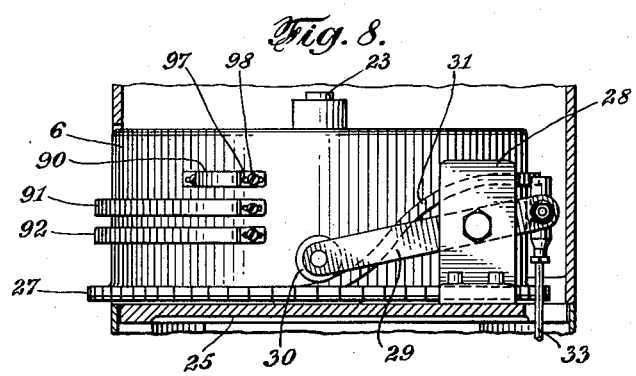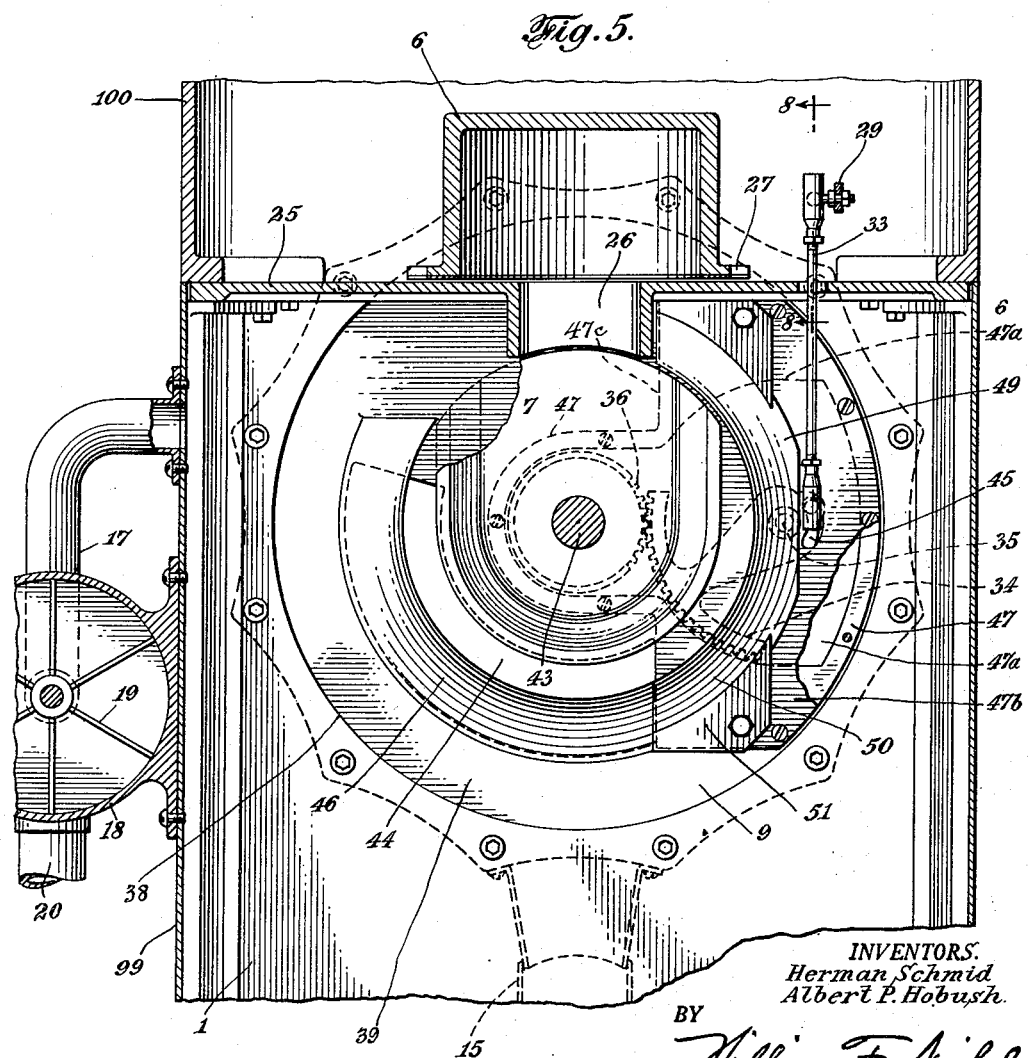

Jan. 25, 1955     H. SCHMID ET AL     2,700,225
COFFEE ROASTER
Filed Dec. 16, 1949                     7 Sheets-Sheet 6

INVENTORS.
Herman Schmid
Albert P. Hobush.
BY William F. Nickel
ATTORNEY.

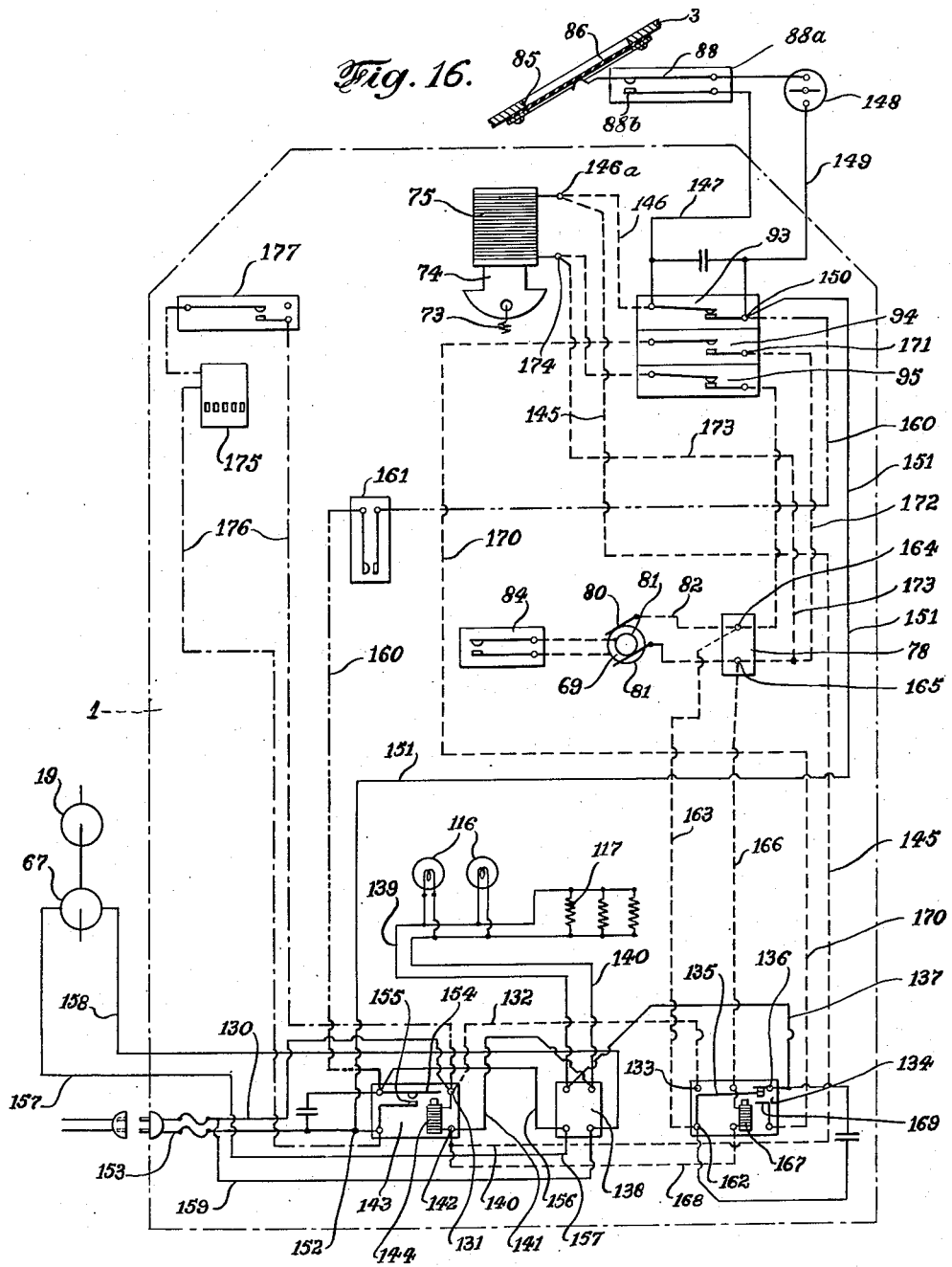

United States Patent Office 2,700,225
Patented Jan. 25, 1955

2,700,225

COFFEE ROASTER

Herman Schmid and Albert P. Hobush, Kingston, N. Y., assignors to Incoro, Inc., Kingston, N. Y., a corporation of New York Application December 16, 1949, Serial No. 133,427

8 Claims. (Cl. 34—45)

Our invention is an improvement in roasting machines, and particularly machines for roasting coffee preparatory to grinding.

An important object of the invention is to provide a roasting machine adapted to be used in connection with the retail distribution of coffee by enabling a dealer to keep green coffee in stock and roast it in the required quantities from time to time, or on each sale, so as to be able to supply perfectly fresh roasted coffee to individual customers.

Another object is to provide a coffee roasting machine having a hopper containing coffee to be roasted, and parts for delivering a predetermined quantity from the hopper to the roasting member when the temperature within the member reaches the proper heating level.

A further object of this invention is to provide connections by which the operation of roasting is continued for the necessary interval of time and then automatically stopped; while the operation of the machine is continued long enough to bring about the gradual cooling of the heated parts. In this way stresses due to contraction are minimized and the operative life of the machine is greatly prolonged.

Still another object is to provide a coffee roasting machine with hopper and parts comprising a rotatable drum between the hopper and the roasting member, in combination with a chute which is moved to connect the loaded drum with the roasting member at the beginning of each operation; and thus charge the member with coffee to be roasted.

Yet a further object is to provide a coffee roaster having a chute to deliver the coffee to the roasting member, and parts for shifting the chute after the roasting into position to deliver the coffee to a bin or receptacle.

An additional object is to provide a coffee roasting machine having adjacent the roasting member a casing containing means for agitating and sifting the roasted coffee beans, to cool them and remove chaff before delivering the coffee to a storage receptacle in the casing.

The nature of the invention is fully described hereinafter and the preferred form of the invention is illustrated in the accompanying drawings. But this disclosure is explanatory only, and we may vary details of construction without departing from the principle of the machine.

On the drawings:

Figure 1 is a front view of a coffee roaster according to our invention, with a grinding section attached.

Figure 2 is a side view of the entire apparatus.

Figure 3 is a vertical longitudinal section on line 3—3 of Figure 2 seen in the direction of the arrows.

Figure 4 is a section partly on line 4—4 of Figure 3, showing part of the operating mechanism of the apparatus, some of the driving members being shown in elevation.

Figure 5 is a section on line 5—5 of Figure 3, showing more of the operating members.

Figure 8 is a section of a detail, on line 8—8 of Figure 5.

Figure 9 is a side view of the controlling drum with cam ribs thereon.

Figure 10 is an axial section through the parts for operating the roasting member in the apparatus.

Figure 11 is a section of a detail.

Figure 12 is a section showing a conveyor to transfer roasted coffee to a bin to be withdrawn for grinding.

Figures 13 and 14 illustrate other details.

Figure 15 is a perspective view of parts of the bearing for the shaft for the roasting cylinder, and Figure 16 is a diagram of the electric circuits which supply power to operate the roaster.

Figure 6:
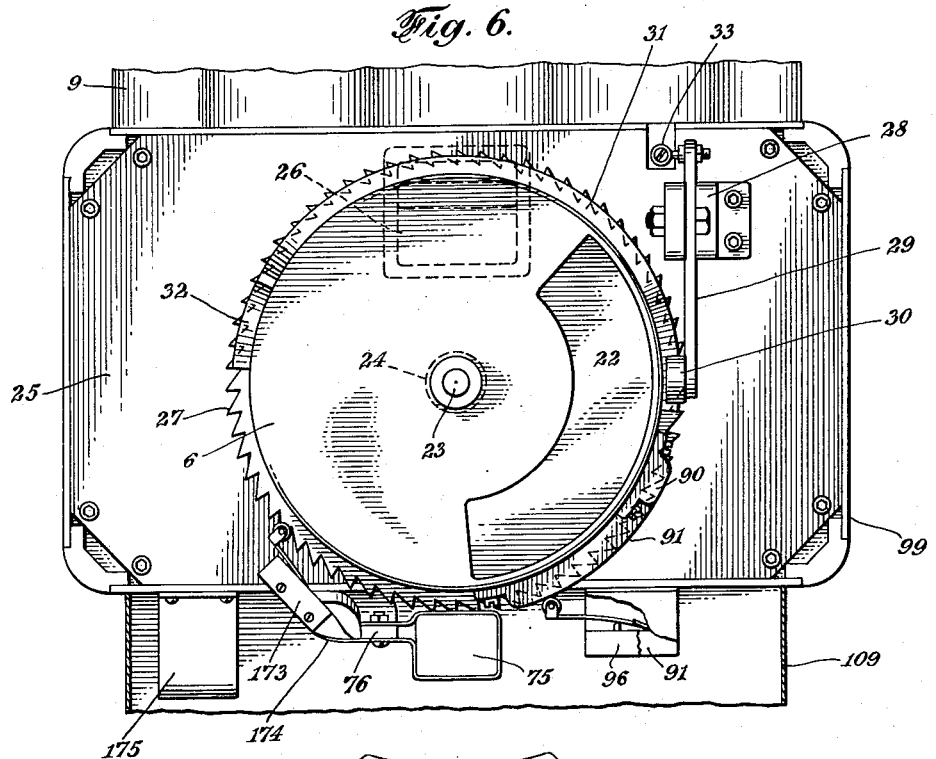
Figure 6 is a plan of the drum which controls the loading of the roaster.
Figure 7:
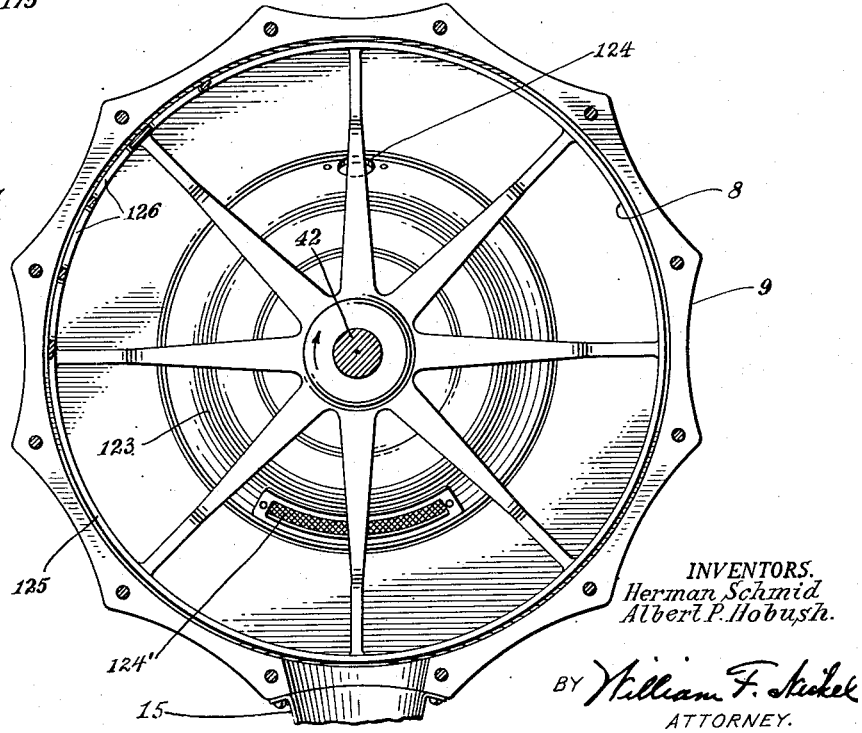
Figure 7 is an elevation of an agitator member in the apparatus, seen from the plane of the line 7—7 in Figure 3 looking in the direction of the arrows.

The roaster and its adjuncts comprise a housing 1 consisting of separate sections, to be described more fully later. See, for example, Figure 3. The coffee is roasted in a heater consisting of a chamber enclosing a rotating cylinder 2. At the top of the housing is a bin or hopper 3 for the green coffee beans, which are transferred to the heater; and afterwards piled in the base or lower part 4 of the roaster; from which they are lifted by a suitable conveyor, to be ground in a casing or section 5. The passage of the green coffee from the bin 3 to the roasting cylinder is regulated by a measuring drum 6; and the admission of the unroasted beans to the cylinder 2 is controlled by a chute 7, which automatically assumes loading and discharge position at the beginning and end of each roasting cycle. When the contents of the cylinder 2 have been treated as required they are delivered to an agitator 8 in a casing 9 on the housing 1, and finally dropped through a conduit 10 into the base section 4, which contains an inclined plate 11 which directs the roasted beans into a receptacle to which access can be had by a gate 12. The gate is hinged at the bottom to the edge of an opening in the base, so that the coffee therein can be scooped out if desired.

The conveyor for lifting the roasted coffee from the receptacle or bin to the grinding apparatus is indicated at 13, in Figure 1; this conveyor being of the screw type in a tubular casing 14; and to the casing 9 of the agitator is connected a conduit 15, through which the husks covering the roasted beans are discharged into a removable drawer 16 at the bottom of the roaster. The vapors of the coffee when being roasted are drawn off through a flue 17 into a casing 18 containing a fan 19; and conducted away to the base section 4 through a flue 20. The flue 17 of course leads from the heating chamber, joined to it adjacent the top of the chute 7.

The hopper 3 for the green coffee has a sloping bottom 21 with a delivery opening at one side to register with a pocket or chamber 22 in the measuring and loading drum 6, that is just above the roasting cylinder 2. This drum is mounted to turn on a stud or journal 23, in a projection or foot bearing 24 in the housing. This bearing is part of a fixed horizontal transverse partition 25 in the housing over the cylinder 2. The chamber 22 is open at the upper and lower end, and after receiving coffee from the bin or hopper 3, the drum 6 turns and discharges the green coffee beans through an outlet 26 in the partition 25. The top of the drum 6 is closed except for the pocket 22, and at the bottom thereof are external gear teeth 27 extending entirely around the circumference thereof to be engaged by a pivoted pawl at the end of a rocking lever to be described later for effecting rotation of the drum as required. The teeth 27 have inclined forward and abrupt rear faces.

Affixed to the partition or floor 25 under the hopper 3 is a bearing lug 28 carrying a bolt or screw which serves as a pivot or fulcrum for a rocker or lever arm 29 having at one end a roller 30. This roller engages a cam track 31 (Figure 9) on the cylindrical outer face of the drum 6. See Figures 8 and 9. This track is level at the top, but its ends are inclined in opposite directions. At the rear of the cam track is an inclined guard rib 32 on the drum to depress the lever 29. The opposite end of the lever 29 is pinned to a rod 33 which passes down through an opening in the floor 25 and is pinned at its lower end to a segmental gear 34, mounted on a fixed journal 35. (See Figure 5.) The journal is between the gear teeth and the point of connection of the gear to the rod 33. This gear 34 meshes with a pinion 36 having a hub 37 that is concentric with the axis of the roasting cylinder 2.

In line with the cylinder 2, the wall of the housing has a large opening 38, which is closed by the casing 9 of the agitator 8. Over this opening between the casing 9 and housing 1 lies the closure plate 39 for the inner end of the casing 9, having a hollow boss 40 in the center which bears the hub 37 of the gear 36. The casing 9 has a central bearing 41 in the outer end supporting one end of a stub shaft 42 upon which the agitator is mounted. This shaft has keyed connection with the end of the shaft 43 carrying the roasting cylinder 2. At the side of the plate 39 is an arc-shaped opening 44 extending from a point about the level of the shaft 43 down past a point directly below it. The plate 39 carries the bearing 40 at the center. The free end of the chute 7 as it rotates, discharges the contents of the cylinder through the opening 44 into the casing 9 when the roasting is finished, by way of the opening 44.

The plate 39 has a fixed curved conical inner rim or flange 46 around the edge of the opening 44 nearest the circumferential edge of the plate 39, and projecting into the housing as far as the adjacent end of the cylinder 2; beyond the rotatable chute 7. See Figures 3 and 5. This rim 46 is about as long as the opening 44 and is made in one with the rest of the plate 39. Also on the face of the plate 39 presented to the chute, is a rib 47 encircling the gears 34 and 36; the plate 39 being somewhat thinner over the space 47a within the compass of this rib. The plate 39 bears the pivot stud 35 for the gear 34 in the space surrounded by the rib 47. Over the rib 47 and the gear 34 lies a thin cover plate 47b with a curved slot 45. The pin joining the rod or link 33 to the gear 34 projects through this slot, so that the rod is in the free space between the cover plate 47b and the chute 7. The cover plate 47b has a large opening for the gear 36. The chute 7 is made rigid with the gear 36. The rib 47 is widened above and below the thinned area 47a; presenting vertical shoulders 47c.

On the face of the cover plate 47b is another plate 49, having a conical rim 50 along one edge which forms a continuation of the flanges 46 from the lower end thereof up to the outlet 26 for the drum 6. At both ends of the rim 50 are projections 51 that enable the plate 49 to be bolted or otherwise secured over to the rib 47 to the plate 39. The rim 50 is cut away on its outer edge adjacent the slot 45 to give clearance to the rod 33.

The end of the cylinder 2 adjacent the chute 7 has an open spider 52 through which it discharges. This spider is covered by the chute 7 in the position shown on Figure 3 when the cylinder 2 is loading. The roller 30 then clears the tops of the teeth 27, the lever being depressed and the rod lifted as in Figure 5.

When the drum 6 revolves it fills with green coffee from the hopper 3, the coffee dropping into the pocket 22 at each revolution; and the coffee is discharged as the drum rotates and the pocket comes into registry with the outlet opening 26 in the partition 25. While the drum is turning, the roller also runs on the cam 31, and depresses the rod 33 which rises again when the end of the cam is reached and the roller is depressed by the rib 32. The gear 34 thus oscillates the gear 36 through a part turn each time, so that the chute 7 registers with the outlet 26 to fill the cylinder 2 and then makes a part turn to its lowermost position to guide the roasted coffee from the cylinder 2 into the casing 9 through the long arc-shaped opening 44.

The end of the shaft 43 on the side of the housing 1 opposite the casing 8 is enveloped by a sleeve 55, which has a head 56 with one or more clutch projections 59. The section of the shaft 43 in the sleeve 55 is reduced somewhat to enter the sleeve, and the thicker part of the shaft adjacent the sleeve has flat faces 59a on the outside to fit within the projections 59, which have flat sides facing the axis of the element 55. See Figure 15. The shaft will therefore turn the sleeve, but can be detached therefrom like the stub shaft 42. Any other way of keying the shaft 43 and sleeve 55 can be employed.

The spider 52 is held on the shaft 43 by a pin 52'. The plate 53 at the opposite end of the cylinder 2 is engaged by the spring washer 58. When the casing 9 is dismounted, the stub shaft 42 can be removed with it, and when the plate 39 is taken off the housing, the cylinder 2 can be pulled out through the opening 39. The main part of the shaft 43 then comes with the cylinder, being pulled out of the sleeve 55 which can remain in place, but can also be taken out when necessary.

The opposite end of the cylinder 2 (Figure 10) is closed by the flanged-over disk or plate 53, and the sleeve 55 of the cylinder 2 is mounted in a holder 54 lined by a bushing 54a in the opposite wall of the housing. The cylindrical wall of the cylinder 2 is made of heat resistant material 56, and the plate 53 has a dished central part through which the shaft 43 passes. Outside the head 53 the shaft 43 has threads; and a spring washer 58 is slipped over the threads against the head 53 and held tight by a nut 58a.

The outer end of the sleeve 55 carries a gear 60, which is turned by a gear 61 on a shaft 62, mounted in a bearing 63 in the wall of the housing 1. On the outer end of this shaft is a pulley 64, which is rotated by a belt 65. This belt is operated by a pulley 66 of an electric motor 67 on the outside of the housing; and a belt tightening pulley 68 may be mounted on the housing to keep the belt in firm engagement with the pulleys 64 and 66.

On the outer end of the sleeve 55 between the gear 60 and the pulley 64 is a cam 69 of insulating material, which operates a rocker lever 70 on a pivot pin 71. This lever carries at its outer end a pivoted pawl 72. To the pawl is attached a spring 73 which connects the pawl to the plunger 74 of a solenoid 75. See Figures 14 and 16. Normally the pawl is not in position to engage the teeth 27 of the drum 6, but when the solenoid is energized, the plunger 74 pulls the spring 73 so that the upper end of the pawl will push against the teeth and turn the drum every time the lever 70 rocks. On the reverse movement of the lever, the pawl slips idly back over the inclined faces of the teeth 27. The solenoid is supported by a bracket 76 on the framework of the housing, secured thereto by any suitable means; and the lever is actuated by the cam 69 against the tension of a spring 77 fixed to the lever and the housing 1.

The outer end of the sleeve 55 also passes through a plate 78 of aluminum, affixed to the outside of the housing by screws 79. This plate also has a bearing in its lower end for the outer end of the shaft 62 carrying the gear 61. The plate is affixed to the housing by screws 79 and is between the gear 60 and the cam 69, so that the end of the sleeve 55 also passes through it. On the plate are insulated terminals containing spring-pressed brushes to engage slip rings 81 on the cams 69. These rings are connected by wires 82 which pass into the cylinder 2 through a bore 83 in the shaft 43 and connect to a thermostat member 84 in the cylinder 2.

In the sloping bottom 21 of the hopper is an opening 85 which is covered by a flexible diaphragm 86. At the center of this diaphragm is fixed a button 87 which cooperates with a movable switch terminal 88. When the hopper contains more than a minimum quantity of coffee, the switch terminals are closed by the weight of the required quantity of green coffee in the bin 3, but when this quantity is not present, the terminals aforesaid separate and the operation of the roaster stops, when the roasting cycle is completed.

The terminal 88 is mounted on a switch box or member 88a carried by the bottom of the bin 3 on its lower face, and containing a cooperating fixed terminal.

The cylindrical surface of the drum 6 has three cams 90, 91 and 92 at the beginning of the cam track 31 on the drum. The first cam is a short one, but the other two are long, and they are all flush with one another at the ends adjacent the track 31. These cams control switches 93, 94 and 95 respectively, in circuits which are described later herein. The switches are mounted on a post 96 on the housing 1. The cam strips have slotted ends 97 which receive fastening screws 98 affixing them to the drum; and by virtue of slots in the ends of the cams receiving the screws, the positions of the cams can be adjusted.

The housing 1 comprises sections one of which 99 has the partition 25 as its top, and contains the roasting cylinder 2. To one outside face of this section 99, usually at the left of the operator (Figure 1) as he faces the front of the housing (Figure 1), the casing 9 is affixed. On the section 99 rests the upper section 100 containing the bin 3, and detachably secured to the section 99 in any suitable way. The section 99 stands on the base section; and is secured thereto as by lugs 101 on the base section 4, to be inside the section 99 at its lower edge, and attached by screws. (See Figure 3.) At the one side of the section 99, the top of the base section 4 is a little lower, and thereon stands the section 5 to which the conveyor 13 delivers. This section 5 is separated from the section 99, and the pulley and other parts on the outside of the section 99 shown in Figures 3 and 10 are between the sections 99 and 5.

The front of the section 99 carries the motor 67, and casing 19 with fan 18 which, as shown in Figure 1, is driven by the motor 67, that is enclosed in a casing 102. The rear side of the section 99 opposite that presented in Figure 1, has a window 103, leading to the heating chamber containing the cylinder 2, and the section 100 has windows 104 and 105 above the casing 9 and section 5 respectively. At the rear, the base 4 has a large window 106 for viewing the roasted coffee therein, and the section 5 has front and rear windows 107 near its top, which has a removable closure 108. The space between the sections 99 and 5 is filled by a removable shield 109 which covers the moving parts therein. The sections can easily be dismounted to give convenient access to all parts. The bin 3 also has a top opening with a closure 108.

One side of the section 5 has a knob 110 above an opening 111 in which there is a platform scale 112. This section contains the grinding mechanism and a motor 113 to operate it, and the adjacent side bears switch 114 and an ordinary wall outlet, not shown, for the prongs of a plug that is attached to a cord conductor so that electric current may flow to energize the motor inside. The knob enables the operator to adjust for grinding the roasted coffee in several ways. This grinding mechanism is fully disclosed and defined in our copending application for a separate patent thereon. Serial No. 133,426 filed of even date herewith.

The inside of the section 99 constitutes a roasting chamber enveloping the cylinder 2. See Figure 3. One end of this is substantially closed adjacent the casing 9 by a partition 115 of heat insulating material. The top, bottom, sides and opposite end of this chamber within section 99 are of similar material, as indicated at 115a. One or more heating lamps 116 are mounted at the bottom of this chamber and several resistance heaters 117 are mounted in it adjacent the roasting cylinder 2. See Figure 13. One side 115a has an opening at the top receiving the end 52 of the cylinder 2 and clearing the outlet 26 of the drum 6.

The base section 4 has an upright partition 118 beneath the section 5 and extending from front to back. This partition in the base 4 divides off a filtering compartment that contains horizontal baffle plates 119 on which are fiber glass filters 120. The flue 20 is connected to the upper part of this compartment, and at the lower end is an outlet opening 121, with a mesh screen over it. The coffee vapors are led through the filters and are completely deodorized when they escape at the outlet 121. Another flue 122 may also be connected to the upper part of the section 5 and led down to dispose its lower end adjacent the opening 121, to evacuate the upper part of the section 5, to which the roasted coffee is delivered by the conveyor 13. A suitable door not shown controls access to the filter compartment.

The inside of the casing 9 contains a central annular rib 123, which is conical on both faces and surrounds the bearing 41. At its topmost point this rib has an opening 124 in its outer face, to which the delivery pipe 10 is coupled. The roasted coffee beans are discharged through the opening 124 down into the base 4, but the husks are retained. These drop down to the bottom of the casing and fall into the flue 15. The agitator 8 has a circular ring 125 joining the outer ends of the vanes or blades and having openings 126 through which the pieces of the husks drop into the flue 15.

The conveyor 13 is operated by a motor in the bottom of the section 4. This conveyor may also have the form of a chain 127 with cups or buckets 128. In both constructions the motors at the bottom of the section 4, are coupled to the conveyor by gearing but the motors are covered so that the roasted coffee is kept out of contact therewith.

The compartment receiving the roasted coffee in the section 4 by way of the conduit 10 can have side walls, and the gate 12 will have sector-shaped side wings 129, so that when the gate is opened, no coffee can fall out at the side edges of the gate.

The electric connections for the motor and other electrical appliances that operate and control the machine are illustrated in Figure 16. A plug at the end of an insulated flexible conductor can be pushed into any ordinary outlet of a wiring system for current. One side 130 of the conductor is joined directly or by a wire to an insulated binding post indicated at 131 at the lower part of the housing; and thence a wire 132 leads to a terminal 133 on the panel 134, also at the lower part of the housing 1. From the terminal 133 the current flows by way of a movable switch terminal 135 to a fixed switch terminal 136, and a conductor 137 joined to a binding post on the terminal block 138, from which a wire 139 leads to the lamps 116 and heater members in multiple, these being united by another wire 140 to a second post on the panel 138, joined by a wire 141 to a binding post 142 on an adjacent panel 143. The post 131 is also on panel 143. The relay coil 144 is connected across the posts 131 and 142. From the post 142 the circuit is completed by a wire 145 running to a binding post 146a on the insulator block 96 at the top of the housing near the solenoid 75, and thence by wires 146 and 147 united to one end of the movable terminal of switch 93, to the switch 88—88b controlled by the diaphragm 86 and main switch 148 in series; and by wire 149 to a terminal 150 at the fixed contact of switch 93, and wire 151 to a junction 152 with the return wire 153.

Hence, when the switch 148 is closed and the weight of the coffee in the bin is sufficient to close the switch points 88—88b, the lamps 116 and heaters will be energized. Current will also flow from the terminal 131 through the coil 144 to the terminal 142, these terminals being on opposite sides of the main circuit, and the coil will then attract an armature 154 having a terminal to engage a fixed terminal 155 connected to the junction 152. All the terminals 131, 142, 154 and 155 together with the coil 144 are on the panel 143. Current now flows from the conductor 151 and the terminals 154 and 155 and wire 156 to another post on the block 138, and wire 157 to the motor 67; back by wire 158 to a similar post on the block 138 and then by wire 159 past the panel 143 and coil 144 to the opposite conductor 130. Also as soon as the switch 148 and the bin switch close, current is taken by a thermostat 161 connected by a wire 160 to the post 150, which is connected to the wire 151 and one side of the circuit adjacent the terminal 155, and by another wire 160 to the terminal 154. The thermostat 161 soon closes as the machine warms up, and closes the same circuit through the motor 67 independently of the relay 144. The purpose of this thermostat is set forth below. The thermostat 161 must of course be inside the section 99 and enveloped by the heat insulating material which covers the inner surface of this section, and close to the cylinder 2. The terminals of this thermostat are indicated at 170a on Figure 4.

When the motor starts, the drum does not at first rotate because the solenoid 75 is not energized. But as the temperature in the heating cylinder 2 increases, the thermostat 84 therein closes, and a circuit is established from the terminal 162 on the panel 134, connected to terminal 133, by wire 163 to the posts on the plate 80, and the rings 81 on the cam 69 through the thermostat back to the plate 78 and by wire 166 to the heater relay coil 167 on the panel 134. This coil is joined by a wire 168 to the post 142. When this coil is thus energized, the switch terminal 135 is pulled down away from terminal 134, and the circuit to the lamps 116 and heaters 117 is broken. Adjacent the terminal 134 is a terminal 169, against which the switch terminal 135 is pulled. A circuit is now established by way of terminals 133, 135 and 169, wire 170 to the switch 94 and thence by wire 172 to the lower terminal on plate 78 and wire 166 back to the coil 167. This coil is now "locked in" so long as the switch 94 is closed, and any erratic operation of the coil 167 due to "hunting" of the thermostat 84 as the temperature in the machine may vary is obviated. The thermostat is adjustable by a member 180 at the center of the cam 69.

The general operation requires first at the starting a warm-up period during which the switch 93 is open, but is bridged by the switch 148 and 88—88b. The feeding drum 6 is in such position, and the switches 94 and 95 are so constructed that the first is closed and the latter open, each with a roller on cams 91 and 92 respectively. Current now flows through the lamps 116 and heater members 117, and as the temperature in the roasting chamber or oven rises, the thermostat 161 (Figures 4 and 16) closes taking current by way of lead 160, at post 150 as above described. This thermostat 161 is thus bridged across the motor relay terminals 155 and 154, which also close, and the motor 67 begins to rotate and turn the cylinder 2. The drum 6, however, does not revolve till later. Normally when the switches 94 and 95 do not have their rollers on the cams, the switch 94 is open and the switch 95 is closed; at the beginning the switch 94 is closed and switch 95 is open. At the end of the warm-up period the thermostat 84 closes.

The closing of the terminals in the thermostat 84 now causes the heater relay coil 144 to be energized and the lamps 116 and heater members 117 are cut out. At the same time the engagement of terminal 135 with terminal 169 locks in the coil 167, as already set forth. Also the circuit being closed through coil 167, the thermostat 84, switch 94 and wire 170 a circuit is closed from wire 172 through wire 173 joined thereto, terminal 174, solenoid 75 and wire 147, to lift the plunger 74 and cause the pawl 72 to engage the teeth 27 on the drum 6. The feeding drum now rotates, bringing its pocket 22 over the outlet 26 to fill the cylinder 2 with green beans. The roller 30 clears the tops of the projecting teeth 27 as the pocket 22 passes the outlet 26; hence the dumping rod 33 is lifted as in Figure 5 and the chute 7 is up and guides the green beans into the cylinder 2. These beans are cool, and they cause the temperature of the roasting chamber to drop, so that the thermostat 84 opens. The switch 94 has already opened because it has passed the cam 91, but the switch 94 is closed after leaving the cam 92. The switch 95 maintains the circuit to the solenoid from the coil 167, till in the rotation of the drum the green coffee has been delivered to the cylinder 2 and the thermostat 84 has cooled. The solenoid 75 is then de-energized and the drum stops, because the plunger 74 sinks and the pawl 72 swings back from the teeth 27. The switch terminal 135 is then released and raised by a spring, not shown, the heater circuit through the lamps 116 and heaters 117 is restored, and the motor 67 keeps running because the circuit is kept closed by the relay coil 144, even if the thermostat 161 opens. Usually this thermostat remains closed during the whole operation.

The cylinder 2 is thus kept rotating till the contents are fully roasted and then the thermostat 84 again closes. The relay coil 167 now cuts out the lamps 116 and heating devices 117, as before, but the switch 94 is still open and the coil 167 cannot now be "locked in." The solenoid 75 now receives current by way of switch 95 which is still closed, and the drum again rotates. The lever 29 is lifted and the dump rod 33 lowered to swing the chute 7 into registry with the opening 44 so that the cylinder 2 can be emptied. When the cam 92 reaches the switch 95, this switch is opened, and no more current can flow by way of this switch to the solenoid 75. The drum then stops with switches 94 and 95 again on the front ends of the cams 91 and 92, and the pocket 22 in position to receive again from the bin or hopper 3. The operation can take place with switch 88—88b closed due to weight of beans on diaphragm. If this switch is open due to lack of beans by weight, the machine will finish roasting. The drum then rotates past roasting position, the circuit being broken by short cam 90 opening switch 93. At this point the drum has operated the dump lever 33, swinging the chute 7 down to position, and discharging the roasted beans. All circuits are broken except through the motor and blower which are kept in operation until the motor thermostat 161 opens when the cylinder 2 cools. To open the manual switch 148 during roasting is the same as opening the switch 88—88b. These two switches must both be closed for the machine to again operate and continue cycle in the manner set forth.

The bottom of the casing 9 has an annular rib 123 surrounding the boss 41. This rib is conical on both faces, and the outer face has a screened opening 124' for ventilation in its lower portion.

A counter 175 is also mounted on the housing 1 connected by wires 176 across the circuit, and is controlled by a switch 177 mounted on the bracket 76. This switch is operated to cause the counter to register by the cam 90. The section 100 has an opening 178 at the front to expose the drum 6 and the cams thereon. As above stated the part of the shaft 43 within the sleeve 55 is made separable like the end 42 for convenient dismounting of the cylinder 2. Vanes 179 in the cylinder agitate the coffee beans during roasting and are set on a diagonal to facilitate emptying the cylinder through the chute into the casing 9.

In parallel with the switch 148 is an outlet 187 to which a time clock can be connected if desired, so that the machine can be made to operate for a selected interval at any time of the day or night.

Having described our invention, what we believe to be new is:

1. Roasting apparatus comprising a housing having a bin, a roasting cylinder below said bin, a movable feed drum between the bin and said cylinder, said drum having ratchet teeth on its periphery, a lever bearing a pawl to engage said teeth, a solenoid having a plunger connected to said pawl to move the pawl to actuate the drum, an electric supply circuit, a switch adjacent the drum to connect said solenoid to said circuit, a cam on the drum to control said switch, heating devices for said cylinder, a motor in said circuit, gearing coupling the motor to said cylinder and lever, and a thermostat in said cylinder, said circuit having electrical connections to include the heating devices, motor and thermostat in the circuit in succession, and means in said circuit by which said thermostat disconnects the heating devices at a predetermined temperature, and energize the solenoid to cause the drum to move into position to load said cylinder from said bin.

2. Roasting apparatus comprising a housing having a bin, a roasting cylinder below said bin, a movable feed drum between the bin and said cylinder, said drum having ratchet teeth on its periphery, a lever bearing a pawl to engage said teeth, a solenoid having a plunger connected to said pawl to move the pawl to actuate the drum, an electric supply circuit, a switch adjacent the drum to connect said solenoid to said circuit, a cam on the drum to control said switch, heating devices for said cylinder, a motor in said circuit, gearing coupling the motor to said cylinder and lever, and a thermostat in said cylinder, said circuit having electrical connections to include the heating devices, the motor and the thermostat in the circuit in succession, and means in said circuit by which said thermostat disconnects the heating devices at a predetermined temperature, and energize the solenoid to cause the drum to move into position to load said cylinder from said bin, said supply also containing a relay for the thermostat and conductors united to said switch and said relay to energize the latter, and connections including another switch controlled by the drum for again closing the circuit of the thermostat after the thermostat has opened.

3. Roasting apparatus comprising a housing having a bin, a roasting cylinder below said bin, a movable feed drum between the bin and said cylinder, said drum having ratchet teeth on its periphery, a lever bearing a pawl to engage said teeth, a solenoid having a plunger connected to said pawl to move the pawl to actuate the drum, an electric supply circuit, a switch adjacent the drum to connect said solenoid to said circuit, a cam on the drum to control said switch, heating devices for said cylinder, a motor in said circuit, gearing coupling the motor to said cylinder and lever, and a thermostat in said cylinder, said circuit having electrical connections to include the heating devices, the motor and the thermostat in the circuit in succession, and means in said circuit by which said thermostat disconnects the heating devices at a predetermined temperature, and energize the solenoid to cause the drum to move into position to load said cylinder from said bin, said supply also containing a relay for the thermostat and conductors united to said switch and said relay to energize the latter, the drum carrying a second cam, and said circuit having connections including a second switch controlled by said last-named cam for again closing the circuit of the thermostat after the thermostat has opened and conductors between said switch and said solenoid to energize the latter and continue the operation of said pawl to return the drum to starting position.

4. Roasting apparatus comprising a housing having a bin, a roasting cylinder below said bin, a movable feed drum between the bin and said cylinder, said drum having ratchet teeth on its periphery, a lever bearing a pawl to engage said teeth, a solenoid having a plunger connected to said pawl to move the pawl to actuate the drum, an electric supply circuit, a switch adjacent the drum to connect said solenoid to said circuit, a cam on the drum to control said switch, heating devices for said cylinder, a motor in said circuit, gearing coupling the motor to said cylinder and lever, and a thermostat in said cylinder, said circuit having electrical connections to include the heating devices, the motor and the thermostat in the circuit in succession, and means in said circuit by which said thermostat disconnects the heating devices at a predetermined temperature, and energize the solenoid to cause the drum to move into position to load said cylinder from said bin, said drum having a pocket open at the top to be filled from said bin, and said housing having a supporting floor for the drum with an outlet through which the drum delivers to the cylinder.

5. Roasting apparatus comprising a housing having a bin, a roasting cylinder below said bin, a movable feed drum between the bin and said cylinder, said drum having ratchet teeth on its periphery, a lever bearing a pawl to engage said teeth, a solenoid having a plunger connected to said pawl to move the pawl to actuate the drum, an electric supply circuit, a switch adjacent the drum to connect said solenoid to said circuit, a cam on the drum to control said switch, heating devices for said cylinder, a motor in said circuit, gearing coupling the motor to said cylinder and lever, and a thermostat in said cylinder, said circuit having electrical connections to include the heating devices, the motor and the thermostat in the circuit in succession, and means in said circuit by which said thermostat disconnects the heating devices at a predetermined temperature, and energize the solenoid to cause the drum to move into position to load said cylinder from said bin, said drum having a pocket open at the top to be filled from said bin, and said housing having a supporting floor for the drum with an outlet through which the drum delivers to the cylinder, a movable chute adjacent the cylinder, under said floor, gearing to swing chute to connect the outlet to the cylinder, a rod connected to said gearing, a lever on said housing, and a cam on the drum to control the lever and the rod.

6. Roasting apparatus comprising a housing, a rotatable cylinder in the housing, a transversely mounted shaft in the housing carrying said cylinder fixed thereon to turn therewith, operating means for the shaft and cylinder, a hopper, a rotatable member between the hopper and the cylinder to control the loading of the cylinder, the axis of said member being perpendicular to said shaft, a chute loosely mounted on said shaft at one end of the cylinder, means connected to said chute and controlled by said member to move the chute into position for the cylinder to be charged from said hopper through said member and said chute, and later to be discharged through said chute, a thermostat in the cylinder rotatable therewith, heating means for the cylinder, an electric circuit to supply current to the heating means and the thermostat, movable terminals connecting said circuit to the thermostat, and devices in said circuit controlled by the thermostat to render the heating means temporarily inoperative.

7. Roasting apparatus comprising a housing, a cylinder in the housing, a transversely mounted shaft in the housing carrying said cylinder fixed thereon to turn therewith, operating means for the shaft and cylinder, a hopper, and a member between the hopper and cylinder to feed the cylinder from the hopper, a chute loosely mounted on said shaft at one end of the cylinder, means connected to said chute and controlled by said member to move the chute into position to be charged from said hopper through said member and said chute, and later to be discharged through said chute, heating means for said cylinder, an electric motor, connections by which the motor operates said member, a supply circuit for said means and said motor, and a thermostat on said housing in circuit with said motor, and connections between the thermostat and the motor to cause the motor to run for an interval after the roasting operation is completed.

8. Roasting apparatus comprising a hopper, a roasting cylinder, a movable feeding drum between the cylinder and the hopper to charge the cylinder from the hopper, a casing adjacent one end of the cylinder, a chute between the casing and the cylinder, a shaft for rotating said cylinder, said chute being loosely mounted on said shaft, a motor and an electric supply circuit, connections between said motor and said shaft, means for rotating said drum and said shaft, connections between said drum and said chute, heating devices for said cylinder, and means in the circuit to connect in said motor and energize said devices and to cause said rotating means to turn the drum and chute into position to charge the cylinder, and then to turn the chute into position to discharge the cylinder into the casing.

References Cited in the file of this patent

UNITED STATES PATENTS

| | | |
|---|---|---|
| 1,912,742 | Van Law | June 6, 1933 |
| 1,981,603 | Mustonen | Nov. 20, 1934 |
| 2,089,663 | Richeson | Aug. 10, 1937 |
| 2,101,417 | Waldvogel | Dec. 7, 1937 |
| 2,295,920 | Vermillion | Sept. 15, 1942 |
| 2,327,282 | McComb | Aug. 17, 1943 |
| 2,340,345 | Richeson | Feb. 1, 1944 |
| 2,463,934 | Allen | Mar. 8, 1949 |
| 2,572,678 | Torres | Oct. 23, 1951 |